US012006689B2

(12) United States Patent
 Clardy et al.

(10) Patent No.: US 12,006,689 B2
(45) Date of Patent: Jun. 11, 2024

(54) EFFICIENT CONTROL OF A HEATING ELEMENT

(71) Applicants: Thomas W. Clardy, Park City, UT (US); Kai Kuck, Park City, UT (US)

(72) Inventors: Thomas W. Clardy, Park City, UT (US); Kai Kuck, Park City, UT (US)

(*) Notice: Subject to any disclaimer, the term of this patent is extended or adjusted under 35 U.S.C. 154(b) by 59 days.

(21) Appl. No.: 17/591,576

(22) Filed: Feb. 2, 2022

(65) Prior Publication Data

US 2022/0243474 A1 Aug. 4, 2022

Related U.S. Application Data

(60) Provisional application No. 63/144,901, filed on Feb. 2, 2021.

(51) Int. Cl.
 *E04D 13/076* (2006.01)
 *E04D 13/10* (2006.01)
 *G05B 19/042* (2006.01)

(52) U.S. Cl.
 CPC ....... *E04D 13/0762* (2013.01); *E04D 13/103* (2013.01); *G05B 19/0425* (2013.01)

(58) Field of Classification Search
 CPC ..... E04D 13/0762; E04D 13/103; H05B 1/02; H05B 2214/02; G05B 19/0425
 USPC ........................................................ 219/213
 See application file for complete search history.

(56) References Cited

U.S. PATENT DOCUMENTS

| 5,763,858 | A  | * | 6/1998 | Jones ..................... | G05D 27/02 |
|---|---|---|---|---|---|
|  |  |  |  |  | 219/544 |
| 2004/0205256 | A1 | * | 10/2004 | Hoffman ................. | H04N 7/185 |
|  |  |  |  |  | 710/1 |
| 2015/0230524 | A1 | * | 8/2015 | Stevens .................... | H05B 1/02 |
|  |  |  |  |  | 219/494 |
| 2016/0084986 | A1 | * | 3/2016 | Zach ......................... | E04H 9/16 |
|  |  |  |  |  | 356/402 |
| 2016/0302264 | A1 | * | 10/2016 | Kessler ................... | H01C 13/00 |
| 2016/0338272 | A1 | * | 11/2016 | Hage ........................ | A01G 9/24 |
| 2016/0355997 | A1 | * | 12/2016 | Lewley .................... | H05B 3/56 |
| 2017/0335523 | A1 | * | 11/2017 | Moussa .................. | E01C 11/265 |
| 2018/0086470 | A1 | * | 3/2018 | Zhao ........................ | F01D 5/282 |
| 2018/0142477 | A1 | * | 5/2018 | Park ......................... | G01S 13/04 |
| 2019/0345719 | A1 | * | 11/2019 | Header .................. | E04D 13/103 |
| 2019/0383967 | A1 | * | 12/2019 | Polebitski .............. | G01K 11/22 |
| 2020/0407976 | A1 | * | 12/2020 | Kochura ............... | E04D 13/103 |

* cited by examiner

*Primary Examiner* — Phuong T Nguyen
(74) *Attorney, Agent, or Firm* — Kunzler Bean & Adamson

(57) ABSTRACT

Apparatuses, systems, and methods are disclosed for efficient control of a heating element. A sensor is configured to detect a state of water in proximity to a heating element. A switch device is configured to control a supply of power to the heating element. A hardware controller device is in communication with the sensor and the switch. The hardware controller device is configured to adjust the supply of power to the heating element using the switch device based on the state of water in proximity to the heating element.

23 Claims, 7 Drawing Sheets

EFFICIENT CONTROL OF A HEATING ELEMENT

CROSS-REFERENCES TO RELATED APPLICATIONS

This application claims the benefit of U.S. Provisional Patent Application 63/144,901 entitled "SYSTEM THAT CAN CONTROL EFFICIENTLY, HEAT TAPE OR OTHER SNOW/ICE MELTING DEVICES" and filed on Feb. 2, 2021, for Thomas W. Clardy, et al., which is incorporated herein by reference in its entirety for all purposes.

FIELD

The present disclosure, in various embodiments, relates to a heating element and more particularly relates to efficient control of a heating element for melting snow and/or ice.

BACKGROUND

Snow and ice dams can cause water to leak through a roof or siding of a building leading to structure damage and/or mold. To address this issue, clear the snow or ice, and allow water to drain off of the roof, heating elements such as heat-tape or heat-cable may be installed onto the roof of a building in climates where winter conditions can cause snow or ice to build up on the roof. These heating systems can consume a considerable amount of power, and are frequently left powered on, even if there is no snow or ice that needs to be cleared or if there is no issue with water draining off the roof, wasting that considerable power. Even when ice or snow remains on a roof, a snow bridge or dome may have formed over a heating element preventing further melting, or a temperature may be too cold for the heating element to melt the ice or snow, in either case, wasting power running the heating element because an observer can still see ice or snow.

SUMMARY

Apparatuses are disclosed for efficient control of a heating element. In one embodiment, a sensor is configured to detect a state of water in proximity to a heating element. A switch device, in certain embodiments, is configured to control a supply of power to the heating element. In some embodiments, a hardware controller device is in communication with the sensor and the switch and is configured to adjust the supply of power to the heating element using the switch device based on the state of water in proximity to the heating element.

Methods are disclosed for efficient control of a heating element. In one embodiment, a method includes monitoring a heating element using a sensor. A method, in a further embodiment, includes determining a state of water in proximity to the heating element based on data from the sensor. In certain embodiments, a method includes adjusting operation of the heating element based on the state of water in proximity to the heating element.

Other apparatuses are disclosed for efficient control of a heating element. An apparatus, in one embodiment, includes means for monitoring a heating element. In some embodiments, an apparatus includes means for determining a state of water in proximity to the heating element based on the monitoring. In a further embodiment, an apparatus includes means for adjusting operation of the heating element based on the state of water in proximity to the heating element.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the disclosure will be described and explained with additional specificity and detail through the use of the accompanying drawings, in which.

DETAILED DESCRIPTION

Figure 1:
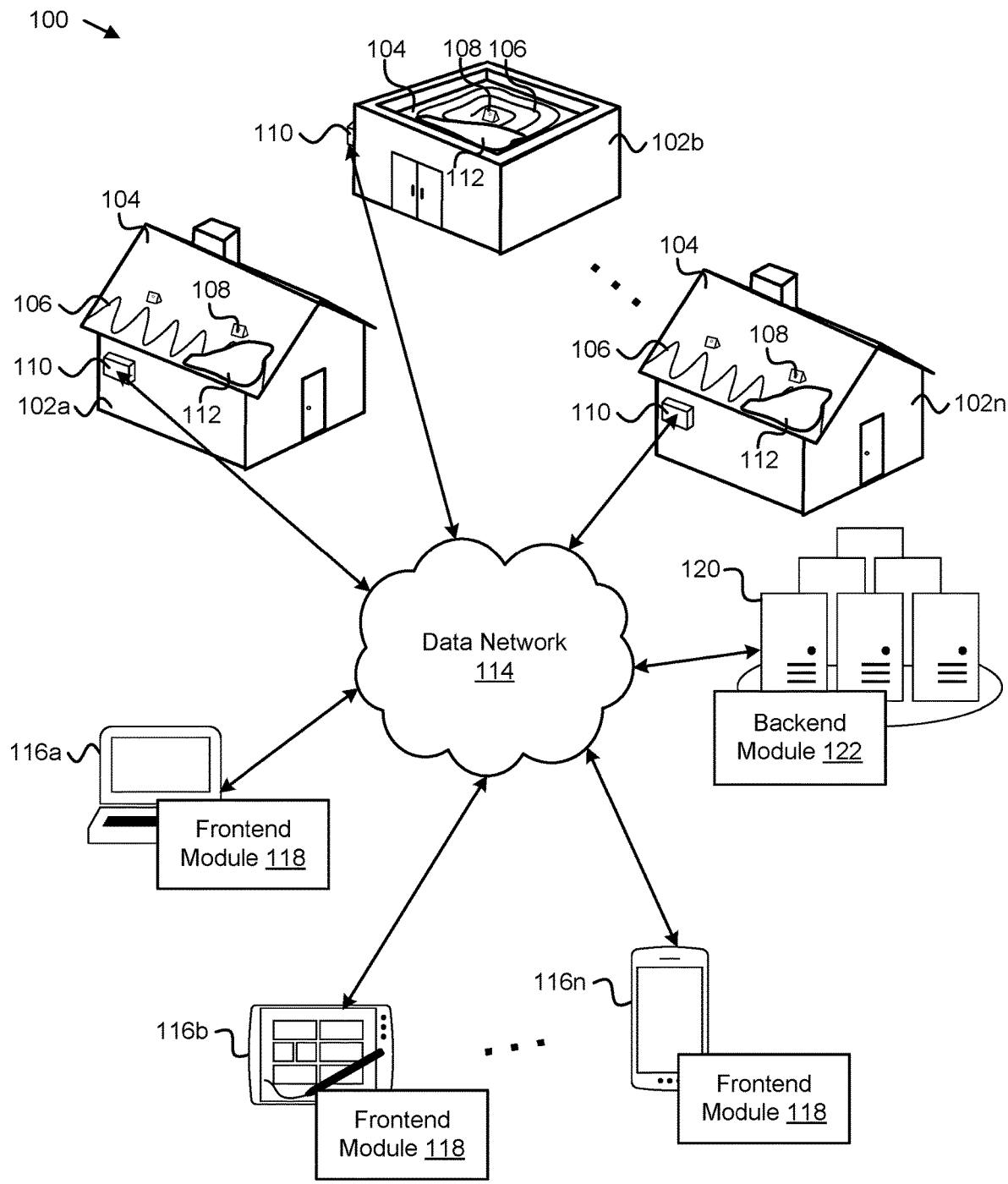
FIG. 1 is a schematic block diagram illustrating one embodiment of a system for efficient control of a heating element.

FIG. 1 depicts one embodiment of a system 100 for efficient control of a heating element 106. In the depicted embodiment, the system includes one or more buildings 102*a-n*, a data network 114, one or more hardware computing devices 116*a-n* each with a frontend module 118, and one or more backend servers 120 each with a backend module 122. A roof 104, in the depicted embodiment, includes one or more heating elements 106 and one or more sensors 108, each associated with a hardware controller device 110. The roofs 104 and/or the one or more heating elements 106 may be partially or completely covered in snow and/or ice 112.

In certain embodiments, a hardware controller device 110 may use data from one or more sensors 108 to make a roof and/or gutter snow and ice melt system 100 more efficient in its energy usage than traditional systems, by detecting ice dams, by detecting a state of water and/or other environmental conditions that may lead to ice dams or other pooling of water, by detecting system failures, or the like, thereby preventing subsequent damage to buildings 102*a-n* that may otherwise occur from uncleared ice and snow conditions, also reducing energy usage, pollution, and cost.

The one or more heating elements 106 may comprise resistive cable that is powered electrically (e.g., heat-tape, heat-cable, or the like), hydronics such as tubing or pipes circulating a warmed antifreeze compound, and/or another selectively enabled heating element 106. The one or more heating elements 106 may be strung in a saw-tooth or other pattern on a roof 104 (e.g., along an edge of a roof 104, up and down the first 1-3 feet of the roof 104, or the like), along or within a gutter (e.g., a rain gutter, a downspout, or the like), and/or at another position on a roof 104. Since melting snow and ice in a winter environment may be an energy intensive task, heating elements 106, in some embodiments, may consume a considerable amount of power.

Without a hardware controller device 110, a user my leave a heating element 106 powered on all winter, even between storms, even when the heating element 106 may clear snow and ice from a roof 104 in a few hours or a few days. A user may leave a heating element 106 powered on due to inattention, an inability to observe whether the area has been melted clear of ice or snow, an inability to observe a state of the heating element 106 due to snow bridging, or the like. A snow bridge or snow dome, as used herein, is a state in which a heating element 106 has melted ice and/or snow around the heating element 106 (e.g., leaving a tunnel, a cave, a cavity, or the like around the heating element 106) and additional melting has slowed or stalled, leaving a cover of snow and/or ice suspended over the heating element 106 (e.g., a bridge and/or dome).

During a snow bridge or snow dome state, without an ice dam, there may be little or no risk of flooding or other damage to a roof 104 and running a heating element 106 may have little or no benefit since melting has stalled. An ice dam, however, in certain embodiments, may cause water accumulation that can lead to damage to a roof 104 and/or a building 102. An ice dam, as used herein, is a state in which ice and/or snow is present on a roof 104 in a roughly and/or partially horizontal orientation (e.g., capable of blocking or capturing water running down the roof 104, or the like).

A hardware controller device 110 (e.g., in cooperation with a backend server 120, a backend module 122, or the like), in certain embodiments, may process data from one or more sensors 108 (e.g., using image processing; using machine learning, machine vision, and/or other artificial intelligence; or the like) to determine a state of water in proximity to a heating element 106, the roof 104 around the heating element 106, a gutter (e.g., a rain gutter, a downspout, or the like), a sidewalk, a driveway, a window, a floor, a ski resort or other location, or the like (e.g., a liquid/wet state, a dry state, a snow state, an ice state, a sleet state, a hail state, a snow bridge state, an ice dam state, or the like); to determine a probability that turning a heating element 106 on or off will have an intended result (e.g., reducing a risk of an ice dam and/or snow coverage); or the like and may adjust or otherwise control a supply of power to the heating element 106 based on the data indicating a state of water, based on the probability, or the like.

For example, in some embodiments, a hardware controller device 110 may turn off a supply of power to a heating element 106 in response to detecting a snow bridge, may turn on a supply of power to a heating element 106 in response to detecting an ice dam or other snow or ice conditions, may turn off a supply of power to a heating element 106 in response to determining a temperature is too low (e.g., below a temperature threshold) for the heating element 106 to effectively melt snow and/or ice, or the like. While a user manually operating a heating element 106 may simply leave the heating element 106 powered on in freezing temperatures, in some embodiments, operating a heating element 106 may be ineffective at melting snow or ice when temperatures are below a temperature threshold, and a hardware controller device 110 (e.g., based on a command from a backend server 120 and/or a backend module 122, based on a weather forecast downloaded over the data network 114, based on a temperature reading from a sensor 108, or the like) may delay powering of a heating element 106 until a temperature (e.g., a measured temperature, a forecasted temperature, or the like) exceeds a temperature threshold, above which the heating element 106 is likely to effectively melt snow and/or ice.

In some embodiments, a hardware controller device 110 (e.g., in cooperation with a backend server 120, a backend module 122, or the like) may use data from one or more sensors 108 (e.g., photos, video, or the like) to determine a geographic location of the building 102, a position and/or orientation of a sensor 108, a pitch of a roof 104, or the like in order to calibrate and/or inform decisions by the hardware controller device 110. For example, a hardware controller device 110 may determine a position of the sun, the moon, a star, a constellation of stars, or the like in a photo and/or video from a sensor 108 to determine a geographic location, a pitch of a roof 104 and/or a heating element 106, a cardinal direction in which a sensor 108 and/or roof 104 is facing, or the like. In a further embodiment, a hardware controller device 110, a frontend module 118, and/or a backend module 122 may provide a user interface for a user to define a geographic location, a roof pitch, a cardinal direction, or the like (e.g., at installation time, at setup time, or the like).

In some embodiments, one or more sensors 108 and/or a hardware controller device 110 may be integrated with and/or packaged with one or more heating elements 106 at a time of manufacture (e.g., and may receive power directly from a heating element 106, a power supply for a heating element 106, or the like). In other embodiments, one or more sensors 108 and/or a hardware controller device 110 may be installed for one or more heating elements 106 after market, or the like.

A sensor 108 and/or a hardware controller device 110, in some embodiments, may be at least partially powered by a heating element 106 itself (e.g., non-invasively, to simplify installation, with no invasion or penetration of the heating element 106, or the like). For example, a sensor 108 and/or a controller 110 may comprise an electromagnetic induction current clamp coupled to an electrical line of a heating element 106 (e.g., to receive power inductively from the electrical line), may comprise a thermoelectric material to generate electrical power using heat from a heating element 106 and/or a temperature differential between the heating element 106 and the surrounding ice/snow, or the like. In such embodiments, a sensor and/or a hardware controller device 110 may have no additional wires run to the top of the roof 104, no on-roof 104 penetration of a power system for a heating element 106, or the like. In a further embodiment, a sensor 108 and/or a hardware controller device 110 may be coupled to an electrical line of a heating element by an electrical connector that does penetrate the electrical line to receive electrical power. In other embodiments, a sensor 108 and/or a hardware controller device 110 may be plugged into an electrical outlet of a building 102*a-n*, hardwired into an electrical system of a building 102*a-n*, hardwired to a data network 114 for communications, or the like.

In embodiments where a sensor 108 and/or hardware controller device 110 only receives power while a heating element 106 is powered on, the system 100 may comprise one or more batteries sufficiently sized to charge while the heating element 106 is powered on and to power the sensor 108 and/or the hardware controller device 110 while the heating element 106 is powered off. A hardware controller device 110, in certain embodiments, may turn on a heating element 106 in response to determining charge of a battery has fallen below a charge threshold, or the like (e.g., to charge the battery).

In a further embodiment, the system 100 may comprise one or more photovoltaic elements (e.g., solar cells, solar panels, or the like) and one or more batteries to power a sensor 108 and/or a hardware controller device 110 using sunlight. A capacity of a battery, a power rating of one or more photovoltaic elements, or the like may be selected to power one or more sensors 108 and/or a hardware controller device 110 using the battery while the one or more photovoltaic elements are covered by snow. For example, one or more photovoltaic elements may charge one or more batteries during a snowless time period when sunlight is available (e.g., spring, summer, fall, or the like) and may store enough energy to power one or more sensors 108 and/or a hardware controller device 110 while the one or more photovoltaic elements are covered by snow. In some embodiments, one or more sensors 108 and/or a hardware controller device 110 may be powered by one or more photovoltaic elements and/or a battery during time periods when sufficient sunlight is available, and may be powered by a line of a heating element 106 (e.g., inductively or the like) during time periods when the one or more photovoltaic elements are covered by snow, or the like.

In order to conserve a battery's charge, in one embodiment, a hardware controller device 110 may only power on and/or collect data from a sensor 108 periodically (e.g., taking a photo, video, and/or other sensor reading every minute, 5 minutes, 10 minutes, 15 minutes, 20 minutes, 30 minutes, 45 minutes, hour, 2 hours, 3 hours, 4 hours, 5 hours, 10 hours, 15 hours, 20 hours, day, or the like). A hardware controller device 110 may set a time period for collecting data using a sensor 108 based on input from a user on a hardware computing device 116*a-n*, based on a weather forecast, based on a temperature, or the like. In other embodiments, a hardware controller device 110 may continuously power and/or sense from a sensor 108 (e.g., if the sensor 108 is low power, if the sensor 108 is powered from an electrical system of the building 102, or the like), may poll a sensor 108 periodically, or the like.

In some embodiments, a hardware controller device 110 may collect data from a sensor 108 even when snow or ice is not expected or anticipated (e.g., in non-winter time periods, or the like). For example, a hardware controller device 110 may use data from a sensor 108 during non-winter time periods to demonstrate solar irradiance, to provide weather data such as precipitation and/or cloud cover, to provide the data to a user (e.g., from a frontend module 118 on an electronic display screen of a hardware computing device 116*a-n*), to examine a condition of a roof 104, to provide a time lapse (e.g., to analyze weathering or roofing materials), to observe surrounding terrain, for security monitoring, or the like.

In one embodiment, a hardware controller device 110 and/or a sensor 108 may process data itself locally. In a further embodiment, a hardware controller device 110 and/or a sensor 108 may send data from one or more sensors 108 over a data network 114 to a backend server 120 and/or a backend module 122 (e.g., a cloud server or other remote server) for processing, for determining how to adjust power to a heating element 106, for determining a state of water for a roof 104, a heating element 106, a gutter (e.g., a rain gutter, a downspout, or the like), a sidewalk, a driveway, a window, a floor, a ski resort or other location, or the like (e.g., a backend server 120 may have more processing power, a higher data storage capacity, or the like than the hardware controller device 110). A backend server 120, a backend module 122, and/or a hardware controller device 110, in some embodiments, in addition to data from a sensor 108, may access weather data (e.g., a weather forecast, real-time weather data, or the like); past performance of the system 100 and/or a heating element 106 (e.g., under similar conditions, or the like); performance of a different system 100 and/or a different heating element 106 in a similar geographic area, with a similar roof 104 pitch/slope, with a roof 104 facing in a similar cardinal direction, with a roof 104 and/or heating element 106 having a similar sun exposure; or the like in order to determine an adjustment to the supply of power to a heating element 106 (e.g., whether to turn the heating element 106 on or off, an amount of power to provide to the heating element 106, or the like).

A hardware controller device 110 may be coupled to and/or otherwise in communication with a switch device configured to control a supply of power to a heating element 106. A switch device may comprise an electrical switch, a relay, a contactor, an amplifier, a dimmer, a hydronic pump, and/or another control device capable of adjusting operation of and/or an amount of power for a heating element 106. A hardware controller device 110 may be integrated with a switch device; may be in communication with a switch device over a hard-wired electrical connection, over a wireless connection, over a data network 114, or the like; and/or otherwise in communication with a switch device to adjust a supply of power to the heating element 106.

In certain embodiments, a hardware controller device 110 is in communication with one or more hardware computing devices 116*a-n* of a user, frontend modules 118, or the like over a data network 114. For example, a hardware controller device 110 may send a status of a heating element 106 (e.g., on or off, a temperature, electrical current draw, power consumption, energy usage, or the like), data from a sensor 108 (e.g., one or more photos, videos, other sensor data, or the like) to a hardware computing device 116*a-n* and/or a frontend module 118, which may display the status, data, or the like to a user on an electronic display screen of a hardware computing device 116*a-n*.

In a further embodiment, a hardware controller device 110 may receive one or more commands and/or controls from a hardware computing device 116*a-n* of a user, a frontend module 118, or the like (e.g., based on user input from a user on the hardware computing device 116*a-n*). For example, a frontend module 118 may provide a user interface to a user on a hardware computing device 116*a-n* enabling a user to turn a heating element 106 on or off, trigger a sensor 108 (e.g., to take a photo, video, and/or other reading), set a temperature for a heating element 106, view a status of a roof 104 and/or a heating element 106, view data from a sensor 108, view energy usage of a heating element 106 and/or a cost thereof, view cost savings over other approaches (e.g., leaving a heating element 106 powered), view energy savings by a hardware controller device 110 over other approaches, view a switching status and/or history of a heating element 106, or the like.

In some embodiments, a hardware controller device 110 and/or a backend module 122 may determine, and a frontend module 118 may notify a user of a hardware computing device 116a-n, of a failure of a heating element 106, of detected damage to a roof 104 and/or a building 102a-n, a forensic record of usage of the heating element 106 (e.g., to reduce home and/or building insurance, to reduce investigation around a roof leak insurance claim, or the like), a measured or otherwise determined precipitation, a determined cloud cover status, or the like.

A sensor 108, in one embodiment, comprises an optical, ultraviolet, and/or infrared wavelength detector, transponder, and/or camera or other emitter/detector capable of detecting a range of wavelengths in the electromagnetic spectrum. In further embodiments, a sensor 108 may comprise an ohmmeter or other impedance sensor 108 configured to determine an electrical impedance and/or resistance of a heating element 106, a radar sensor/transponder, an acoustic sensor/transponder, a thermometer (e.g., measuring a temperature inside the building 102a-n, measuring an ambient temperature, measuring a temperature of the roof 104, or the like), a sensor of a status of a heating system within the building 102a-n, or the like. A sensor 108 may comprise a communications interface, such as a network interface card (NIC), a wireless interface, a serial interface, or the like configured to communicate with a hardware controller device 110 over a wireless connection, a hard-wired connection, a data network 114, indirectly through a backend server device 120 and/or a backend module 122, or the like.

A hardware controller device 110, a backend module 122, or the like may be configured to correlate and/or track a history of data from a sensor 108 (e.g., of a detected state of water) over time to tune and/or improve determination of one or more states of water (e.g., determining whether a roof 104, a heating element 106, or the like is in a liquid/wet state, a snow state, an ice state, a dry state, a hail state, a sleet state, a snow bridge state, an ice dam state, or the like), and may make subsequent adjustments and/or decisions of when to power a heating element 106 based at least partially on the tracked history (e.g., in combination with current data from a sensor 108, or the like). For example, in some embodiments, a hardware controller device 110 and/or a backend module 122 may use machine learning and/or other artificial intelligence to learn and/or correlate data from a sensor 108 (e.g., power consumption of a heating element 106, impedance and/or resistance of a heating element 106, images and/or video from a sensor 108, ultrasound and/or other acoustic data from a sensor 108, radar data from a sensor 108, or the like) with different states of water and/or other environmental conditions over time and may control a state of a heating element 106 (e.g., control a supply of power to the heating element 106) based thereon.

In a further embodiment, a hardware controller device 110 and/or a backend module 122 may learn from a user's manual control of a heating element 106 over time (e.g., using local controls at a building 102a-n, interacting with a frontend module 118 executing on a hardware computing device 116a-n, or the like) and may control a state of a heating element 106 based on the user's previous manual control, may make suggestions to a user (e.g., through a user interface of a frontend module 118 on an electronic display screen of a hardware computing device 116a-n) of whether to turn a heating element 106 on or off, or the like.

In some embodiments, a sensor 108 may be coupled to a roof 104 proximate one or more heating elements 106. A sensor 108 may have a wide field of view (e.g., a wide-angle lens, a fish-eye lens, or the like). For example, a sensor 108 may have a less than 180 degree view, at least a 180 degree view, at least a 210 degree view, at least a 270 degree view, about a 360 degree view, or the like. Multiple sensors 108 may be disposed at different locations on a roof 104 or at the same location facing different directions, to capture different angles, fields of view, or the like relative to one or more heating elements 106.

In some embodiments, one or more sensors 108 may be integrated with and/or otherwise disposed along a heating element 106 itself. For example, moisture sensors 108, ohmmeter or other impedance sensors 108, sensors 108 to detect a range of wavelengths of the electromagnetic spectrum, or the like may be disposed periodically along a heating element 106 (e.g., every meter, every 1.5 meters, every 2 meters, every 3 meters, every 4 meters, every 5 meters, more than 5 meters apart, or the like). A hardware controller device 110 and/or a backend module 122 may correlate impedance of a heating element 106 at various temperatures, states of water, and/or environmental conditions to subsequently determine whether the heating element 106 is covered in ice, or the like. In-line sensors 108 may be powered directly from the heating element 106 itself, may have local batteries for sensing data when the heating element 106 is powered off, may communicate wirelessly, may communicate over a cable and/or wire of the heating element 106, may communicate over a separate communications cable and/or wire, or the like.

In some embodiments, the system 100 and/or a sensor 108 includes a light source, an emitter, a transmitter, a transponder, or other active lighting or signal source directed at and configured to illuminate for a sensor 108 a heating element 106 or other portion of a roof 104, in one or more ranges of wavelengths of light or sound (e.g., a visual spectrum, an ultraviolet spectrum, an infrared spectrum, an ultrasonic spectrum, an electromagnetic spectrum, or the like). For example, a sensor 108 may comprise an emitter such as a light emitting diode (LED) and a detector such as a diode, or the like. A light source and/or emitter may provide active lighting or transmit other wavelengths in one or more preset patterns, such as a grid pattern, a spatial pattern (e.g., to aid in detection of how thick ice is), a temporal pattern (e.g., modulated over time to cancel out noise from precipitation), or the like. A sensor 108 (e.g., a camera), a light source and/or emitter, or the like may comprise a polarization filter. A polarization filter may be set at different angles for different active light sources, different cameras or other sensors 108, for different wavelength ranges, or the like.

While the depicted system 100 depicts buildings 102a-n with slanted roofs 104, in other embodiments, a system 100 may include a building 102 with a flat roof (e.g., with a vinyl and/or rubber coating, or the like). One or more sensors 108 and/or a hardware controller device 110, in certain embodiments, may be hydrophobic and/or otherwise optimized to repel and/or shed water, ice, or snow, such as a durable water resistant (DWR) coating, a nano material, or the like.

In some embodiments, a hardware controller device 110 may control an entire heating element 106 at once, turning a supply of power on or off, or the like. In other embodiments, a hardware controller device 110 may independently control multiple individual segments or other portions of a heating element 106 (e.g., based on data from different sensors 108, based on known locations of the individual segments or other portions, or the like).

The system 100, in one embodiment, includes several independent buildings 102a-n (e.g., in a neighborhood, a city, and/or another region). A backend module 122 and/or a backend server 120 may monitor the different buildings 102a-n, calculate analytics, feed them back to the individual hardware controller devices 110, or the like. In some embodiments, a backend module 122 and/or a backend server 120 may prevent multiple buildings 102a-n in geographic proximity (e.g., on a same electrical grid, or the like) from switching on their heating elements 106 at the same time, within a predefined time period, or the like.

In a further embodiment, (e.g., in response to a request from and/or in cooperation with a utility, or the like) a backend module 122 and/or a backend server 120 may send a command to one or more hardware controller devices 110 to provide power to heating elements 106 in response to a power outage affecting other buildings 102, other hardware controller devices 110, and/or other heating elements 106. For example, if a utility experiences a power outage in part of a city or other region, it may take some amount of time to reduce power generation, and the utility may experience a period with excess power that could damage transformers or other equipment, and the utility may send a command via an interface of a backend module 122 and/or a backend server 120 to power on heating elements 106 not affected by the power outage to drain, bleed, dump, burn off, or otherwise consume excess power until power generation can be adjusted, until the power outage can be resolved, or the like. In some embodiments, (e.g., in response to a request from and/or in cooperation with a utility, or the like) a backend module 122 and/or a backend server 120 may send a command to one or more hardware controller devices 110 to reduce and/or turn off power to a heating element 106 (e.g., for purposes of load shedding in response to electrical demand exceeding capacity, rolling blackouts, or the like).

In certain embodiments, it may be desirable to have little or no electronics on the rooftop 104. For example, for some buildings 102a-n it may be difficult to run power cables, to run data cables, local, state, and/or national electric codes may prohibit mixing alternating current (AC) and direct current (DC) (e.g., low power and high power) in the same conduit, additional conduit may be undesirable, rooftop 104 temperatures may be too extreme, it may not be aesthetically pleasing, radio frequency transmissions may be impeded, or for another reason. In these embodiments, a hardware controller device 110 may use a lens or lenses to collect light, and fiberoptics to transport optically (e.g., photons) images or video of the roof 104 state, to an electrooptical sensor 108, such as a charge-coupled device (CCD), a complementary metal-oxide-semiconductor (CMOS) device, a thermal device, an infrared device, or other sensor 108 located in a different area offset from the rooftop 104.

For example, a sensor 108 comprising a fiber and/or electrooptical interface may be located inside a junction box (e.g., a heating element 106 junction box, another roof junction box, or the like), an area accessible from ground level, inside a protected structure (e.g., a building 102a-n), and/or another area. Sheltering the electronics of a sensor 108 in a more protected, less exposed area, in some embodiments, may have the advantages of protecting them and eliminating the need for wireless (e.g., radio frequency based) and/or wired power or data cables, battery systems, charging systems, or the like and may allow for less ruggedized electronic equipment to be used. It may also be more convenient and/or cost efficient for an installer of a sensor 108 to run an electronically inert fiberoptic line to an observation point on the roof 104.

A sensor 108 comprising fiberoptics may have multiple strands (e.g., lumens). Additional lumens, in some embodiments, may carry light of various wavelengths to illuminate an area to be observed, such as infrared and/or visible light for night observation. In a further embodiment, a single stranded fiber may be used and light may be pulsed, with a receive, observation state interspersed with transmitted bursts of illumination, or the like. In other embodiments, a multimode, mixed mode, and/or confocal fiber may be used.

In some embodiments, it may be desirable to know the temperature and/or humidity of the roof 104, and a thermometer and/or humidity sensor may be placed within visible range of a fiber lens sensor 108 for direct observation, or a Bragg grating may be applied to the fiber to detect temperature and/or humidity. Additionally, in certain embodiments, a hardware controller device 110 may detect ice via one or more fibers with non-traditional lenses. A hardware controller device 110 may categorize and/or detect the refractivity, reflectance, and/or absorbance of ice with a fiber-based system without traditional lenses (e.g., to reduce costs or the like). In other embodiments, a fiberoptic line may transmit light energy to a rooftop 104 sensor 108 to convert the light energy to electrical energy via a photovoltaic cell, a thermoelectric generator (TEG), or the like.

In one embodiment, a four-strand optical fiber may run from a junction box, located at or near a heating element 106 junction box, along a same path as the heating element 106 up to the rooftop 104 and may be terminated with two fiber strands having a lens, two fiber strands being used as infrared light emitters, or the like. A location for the lenses and the emitter terminations may be at a location above a sawtooth pattern of the heating elements 106, or the like. For example, one lens may face down toward an edge of the roof 104, and the other lens may face parallel to a length of the roof 104, along the length of a sawtooth pattern of a heating element 106, each with an infrared light emitter positioned to illuminate the field of view, or the like. Lenses and emitters, in some embodiments, may be housed in a ruggedized and/or weather resistant housing. Electrooptical components such as a CCD camera or other fiber optic camera device that converts photons into a digital image that is then sent to a hardware controller device 110, in one embodiment, may be housed in a junction box.

In one embodiment, a sensor 108 may comprise a radar sensor 108, such as a synthetic-aperture radar (SAR), an advanced millimeter-wave remote sensing instrument, a scanning radar, a phased array, an electronically scanned array, a beam steering antenna array, a split-ring resonator (SRR), or the like. A sensor 108, in some embodiments, may comprise multiple single-chip frequency-modulated continuous-wave (FMCW) radar transceivers, or the like. A hardware controller device 110 and/or a backend module 122 may build a map, image, and/or other distance measurement of a rooftop 104 based on radar data and may detect changes in the measurements due to ice, and may control one or more heating elements 106 to melt the detected ice. A radar sensor 108 may be accurate to within a millimeter, 2 millimeters, a few millimeters, or the like. In some embodiments, a radar sensor 108 may be designed for harsh environments. A hardware controller device 110 and/or a backend module 122 may also measure radar reflections off or gutters (e.g., to measure ice in or on the gutters, or the like), to either subtract the reflections, use the reflections to enhance the measurements, or the like.

A hardware controller device 110 and/or a backend module 122 may use radio frequency reflection measurements from a sensor 108 to accurately measure the distance from one or more points on a roof 104 to a location where an ice dam is likely to form. From these measurements, a hardware controller device 110 and/or a backend module 122 may map a nominal state of the roof 104 and detect deviations therefrom via periodic measurements, or the like.

In some embodiments, instead of being located on top of a roof 104, a radar sensor 108 may be located beneath the roof 104, under the eaves, within the building 102 (e.g., in an attic), or the like, and may be aimed upward through the roof 104 toward a location where an ice dam is likely to form, or the like. For example, building materials of a roof 104 may be substantially transparent to radio frequencies, or the like. Locating a sensor 108 beneath a roof 104 may ease environmental requirements, protect the sensor 108 from the elements, have easier access to power, avoid placing electronics on the rooftop 104, or the like. In various embodiments, a radar transmitter, receiver, secondary surveillance radar (SSR), transducer, or the like may be located beneath a roof 104, and a hardware controller device 110 and/or a background module 122 may use interferometry to detect ice on a roof 104.

A hardware controller device 110 and/or a backend module 122 may map nominal reflectivity for use in detecting ice based on subsequent, periodic measurements. In a further embodiment, a hardware controller device 110 and/or a backend module 122 may use a passive radar sensor 108 (e.g., capable of sensing only) to map the nominal state of the roof 104, for subsequent use in detecting ice. A passive radar sensor 108, in some embodiments, may allow for measurements based on distant transmitters, and may have sufficiently accurate detail over time, based on emitters such as space-based telecommunications systems, terrestrial radar systems, communications broadcasts, and the like.

A hardware controller device 110 and/or a backend module 122 may use point measurements to measure distances from an object such as a vent pipe, a chimney, or the like to a roof 104 edge. As ice formation builds up on a roof 104 edge, the measurement from a sensor 108 may change, allowing for detection by a hardware controller device 110 and/or a backend module 122. A hardware controller device 110 and/or a backend module 122 may be able to distinguish between and/or "see through" snow, so that even hidden ice on the roof 104 may be detected.

In one embodiment, a sensor 108 comprises an acoustic sensor 108 and/or transponder, that uses an acoustic sound (e.g., a chirp, an ultrasound, reflected acoustic signals, acoustic resonance, or the like) to detect ice and/or another state of water. For example, an acoustic sensor 108 may include an ultrasonic transponder, a sonic transponder, a subsonic transponder, or the like. An acoustic sensor 108 may be disposed beneath a roof 104 (e.g., aimed upward through the roof 104 toward the sky but aligned with a pitch of the roof 104), at a location likely to form an ice dam, within a gutter (e.g., a rain gutter, downspout, or the like), at an apex of a roof 104, on an elevated area (e.g., a vent, an exhaust pipe, a chimney), or the like. A larger aperture of detection may be created by placing multiple transceivers in various locations, enabling detailed observation, or the like. For example, an ultrasonic transducer or other acoustic sensor 108 may be mounted on a vent pipe a distance away from an edge of a roof 104, and aimed toward the edge of the roof 104.

A hardware controller device 110 and/or a backend module 122 may use distance measurements from a sensor 108 to map a roof 104, determine changes and/or deltas between the energy transmitted by an ultrasonic sensor 108 and received back by the ultrasonic sensor 108, to determine a state of water, a location of ice, whether a gutter is blocked or obstructed, or the like. An ultrasonic sensor 108 may be tuned to transmit one or more specific frequencies that are reflected by ice, absorbed by ice, pass through snow, or the like (e.g., ice may have a distinct signature from snow, or the like). For example, snow may dampen an acoustic signal and ice may reflect the acoustic signal, so an ultrasonic sensor 108 may detect a loss from snow and a bounce from ice, or the like.

In a further embodiment, an ultrasonic sensor 108 and/or transponder may be used to detect other blockages, such as leaves, pine needles, branches, or the like and a hardware controller device 110 and/or a backend module 122 may notify a user (e.g., using a frontend module 118 executing on a hardware computing device 116*a-n* on an electronic display screen, or the like). In one embodiment, an ultrasonic transducer sensor 108 (e.g., in a waterproof housing or the like) is disposed in a properly sized hole in a gutter (e.g., a rain gutter and/or downspout), sitting flush within the gutter, or the like. In another embodiment, an ultrasonic transducer sensor 108 may be connected to a gutter via an acoustically reflective conduit to the gutter, or the like.

In some embodiments, a sensor 108 may comprise a load sensor, configured to measure and/or detect a state of water based on a weight of snow and/or ice on the sensor 108. A hardware controller device 110, in a further embodiment, may receive temperature data from multiple sensors 108 at different distances from a heating element 106, and may determine a state of water based on a differential between a temperature at or near the heating element 106 and an ambient temperature further away from the heating element 106, or the like (e.g., temperature gradient monitoring). A sensor 108, in certain embodiments, may comprise a piezoelectric sensor 108 to measure pressure on the sensor 108, temperature, or the like to determine a state of water.

In one embodiment, a hardware controller device 110 may comprise a computing device, an information processing device, or the like, comprising a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a volatile memory, and/or a non-volatile storage medium. In certain embodiments, a hardware controller device 110 may be in communication with one or more backend hardware servers 120 via a data network 114. A hardware controller device 110, in a further embodiment, is capable of executing various programs, program code, applications, instructions, functions, or the like, as described herein.

In one embodiment, the system 100 includes one or more hardware computing devices 116*a-n*. The hardware computing devices 116*a-n* (e.g., computing devices, information handling devices, or the like) may include one or more of a desktop computer, a laptop computer, a mobile device, a tablet computer, a smart phone, a set-top box, a gaming console, a smart TV, a smart watch, a fitness band, an optical head-mounted display (e.g., a virtual reality headset, smart glasses, or the like), an HDMI or other electronic display dongle, a personal digital assistant, and/or another computing device comprising a processor (e.g., a CPU, a processor core, an FPGA or other programmable logic, an ASIC, a controller, a microcontroller, and/or another semiconductor integrated circuit device), a volatile memory, and/or a non-volatile storage medium. In certain embodiments, the hardware computing devices 116*a-n* are in communication with one or more backend hardware servers 120, one or more hardware controller devices 110, or the like via a data network 114. The hardware devices 116a-n, in a further embodiment, are capable of executing various programs, program code, applications, instructions, functions, or the like, such as a frontend module 118.

The data network 114, in one embodiment, includes a communications network that transmits analog and/or digital communications. The data network 114 may include a wireless network, such as a wireless cellular network, a local wireless network, such as a Wi-Fi network, a Bluetooth® network, a LoRa or other spread spectrum network, a near-field communication (NFC) network, an ad hoc network, or the like. The data network 114 may include a wide area network (WAN), a storage area network (SAN), a local area network (LAN), an optical fiber network, the internet, or other communications network. The data network 114 may include two or more networks. The data network 114 may include one or more servers, routers, switches, and/or other networking equipment. The data network 114 may also include one or more computer readable storage media, such as a hard disk drive, an optical drive, non-volatile memory, RAM, or the like.

In one embodiment, the one or more backend servers 120 and/or one or more backend modules 122 (e.g., as remote cloud servers, using cloud computing, or the like) provide central management of the networked hardware controller devices 110. A backend server 120 may include one or more servers located remotely from the hardware devices 116a-n and/or the hardware controller devices 110. A backend server 120 may include at least a portion a backend module 122 and/or a frontend module 118, may comprise hardware of a backend module 122 and/or a frontend module 118, may store executable program code of a backend module 122 and/or a frontend module 118 in one or more non-transitory computer readable storage media, and/or may otherwise perform one or more of the various operations of a backend module 122 and/or a frontend module 118 described herein.

Figure 2:
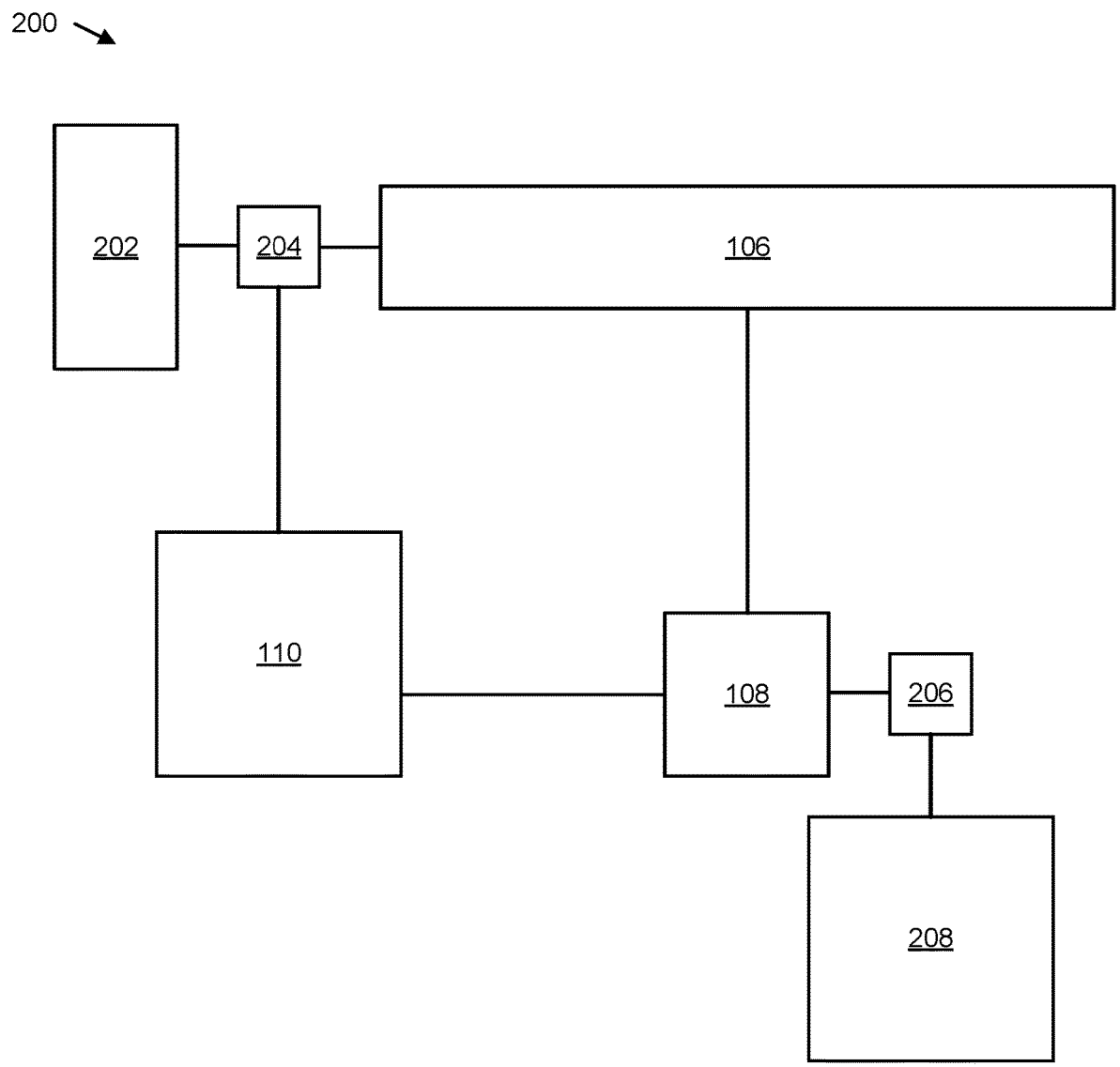
FIG. 2 is a schematic block diagram illustrating a further embodiment of a system for efficient control of a heating element.

FIG. 2 depicts one embodiment of a system 200 for efficient control of a heating element. The system 200, in certain embodiments, may be substantially similar to the system 100 described above with regard to FIG. 1. In the depicted embodiment, the system 200 includes a power supply 202, a switch device 204, a heating element 106, a hardware controller device 110, a sensor 108, one or more batteries 206, and one or more photovoltaic elements 208.

As described above, in some embodiments, a hardware controller device 110 is coupled to or otherwise in communication with a switch device 204, and may control the switch device 204 to adjust a supply of power to the heating element 106 from the power supply 202, based on data from a sensor 108 indicating a state of water in proximity to the heating element 106 and/or an associated roof 104. In various embodiments, a hardware controller device 110 and/or a sensor 108 may receive power directly from the power supply 202, indirectly from the power supply 202 through the heating element 106, or the like.

In the depicted embodiment, at least the sensor 108 receives power from the battery 206 and/or the one or more photovoltaic elements (e.g., solar panels and/or cells). As described above, in certain embodiments, capacity of a battery 206, a power rating of one or more photovoltaic elements 208, or the like may be selected to power one or more sensors 108 and/or a hardware controller device 110 using the battery 206 while the one or more photovoltaic elements 208 are covered by snow.

Figure 3A:
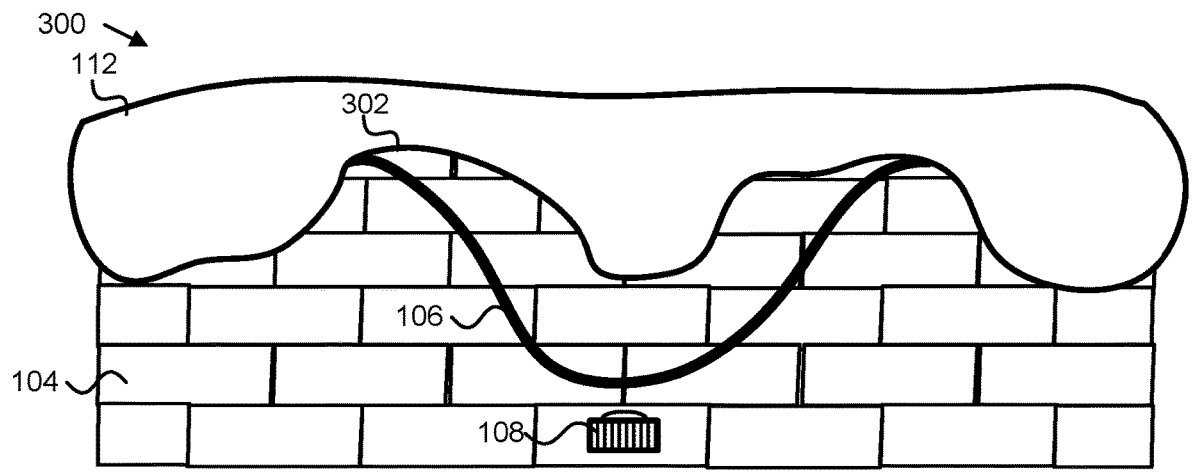
FIG. 3A is a schematic block diagram illustrating one embodiment of an apparatus for efficient control of a heating element with a snow bridge.

FIG. 3A depicts one embodiment of an apparatus 300 for efficient control of a heating element 106 with a snow bridge 302. In the depicted embodiment, the snow bridge 302 comprises a dome arching over the heating element 106 which may have melted the snow 112 to form the snow bridge 302, leaving the roof 104 around the heating element 106 substantially dry, preventing new snow from reaching the heating element 106, or the like. A hardware controller device 110 may use the sensor 108 to detect the snow bridge 302 and/or otherwise determine that a state of water for the heating element 106 is dry and may adjust a power supply 202 to turn off the heating element 106, turn down a temperature of the heating element 106, or the like.

Figure 3B:
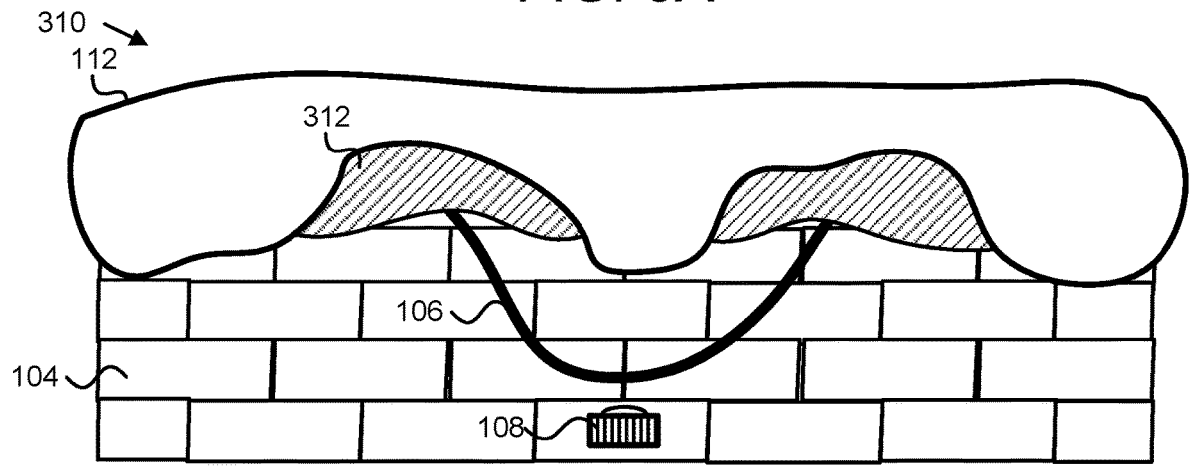
FIG. 3B is a schematic block diagram illustrating a further embodiment of an apparatus for efficient control of a heating element with an ice dam.

FIG. 3B depicts one embodiment of an apparatus 310 for efficient control of a heating element 106 with an ice dam 312. In the depicted embodiment, the ice dam 312 runs substantially horizontally along the roof 104, such that a liquid running down the roof 104 may pool along the ice dam 312. A hardware controller device 110 may use the sensor 108 to detect the ice dam 312 and/or otherwise determine that a state of water for the heating element 106 is an ice state, a wet state, or the like and may adjust a power supply 202 to turn on and/or to keep on the heating element 106, continuing to monitor the ice dam 312 using the sensor 108 until the heating element 106 has melted the ice dam 312, or the like.

Figure 3C:
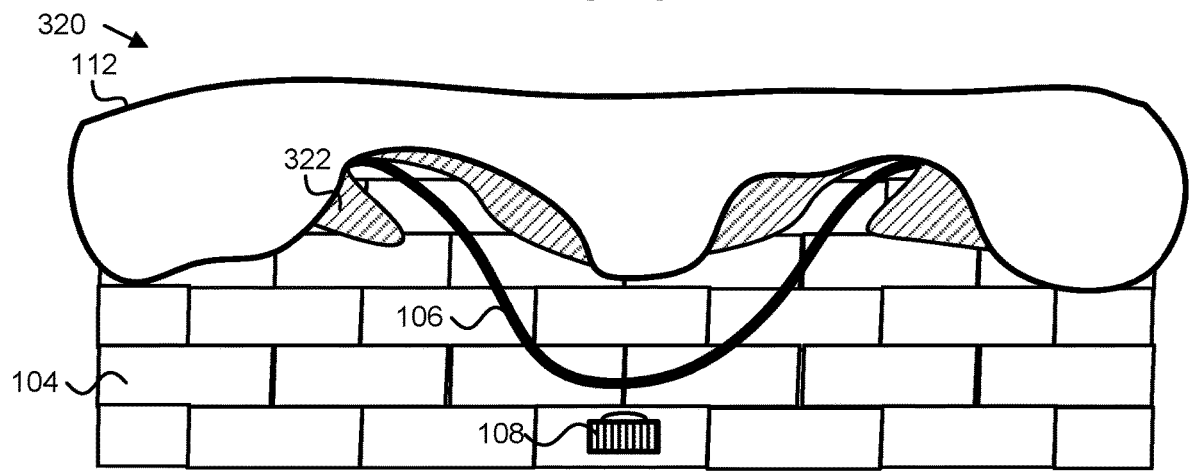
FIG. 3C is a schematic block diagram illustrating a certain embodiment of an apparatus for efficient control of a heating element with ice formation.

FIG. 3C depicts one embodiment of an apparatus 320 for efficient control of a heating element with ice formation 322. In the depicted embodiment, the ice formation 322 is proximal the heating element 106. For example, the ice formation 322 may be caused by a thaw runoff which subsequently froze but has not yet created an ice dam 312. Even though the ice formation 322 has not yet formed an ice dam 312, in some embodiments, a hardware controller device 110 may use the sensor 108 to detect the ice formation 322 and/or otherwise determine that a state of water for the heating element 106 is an ice state, a wet state, or the like and may adjust a power supply 202 to turn on and/or keep on the heating element 106 to melt the ice formation 322 (e.g., to prevent an ice dam 312 from forming, or the like).

Figure 4A:
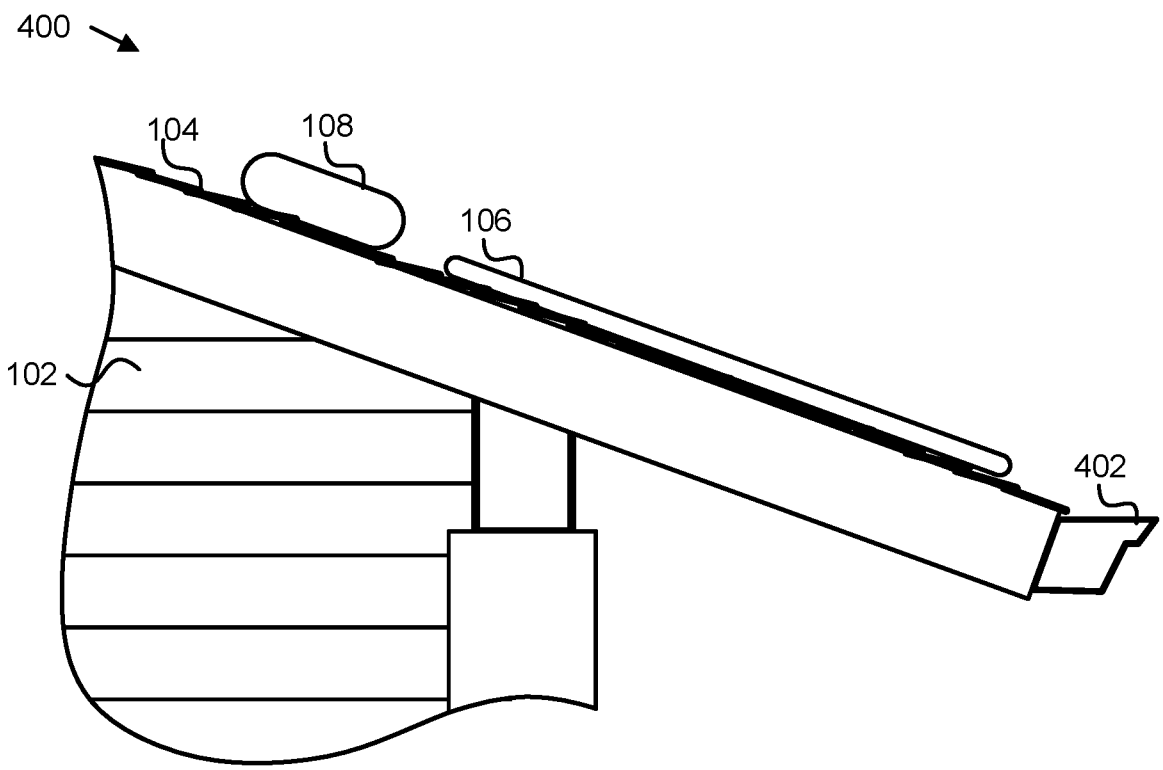
FIG. 4A is a schematic block diagram illustrating one embodiment of a system for efficient control of a heating element.

FIG. 4A depicts one embodiment of a system 400 for efficient control of a heating element 106. In the depicted embodiment, the system 400 includes a sensor 108 disposed on a top surface of the roof 104 above the heating element 106, in order to detect data indicating a state of water for the heating element 106, or the like.

Figure 4B:
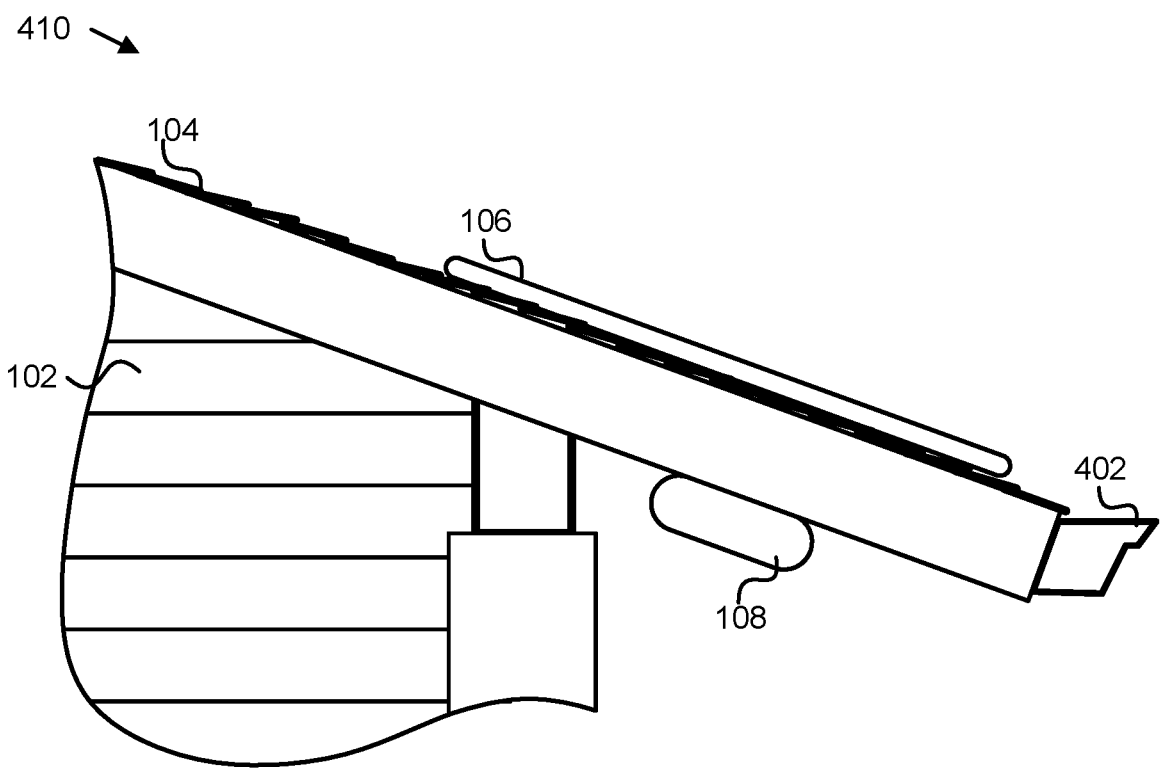
FIG. 4B is a schematic block diagram illustrating a further embodiment of a system for efficient control of a heating element.

FIG. 4B depicts one embodiment of a system 410 for efficient control of a heating element 106. In the depicted embodiment, the system 400 includes a sensor 108 disposed beneath the roof 104, in order to detect data indicating a state of water for the heating element 106 disposed above the sensor 108, or the like. For example, in various embodiments, the sensor 108 may comprise a radar sensor 108 including a transmitter and/or transponder, an ultrasonic sensor 108 including a transmitter and/or transponder, or the like, oriented substantially upward toward the sky, but at a pitch of the roof 104, which may sense data indicating a state of water through materials of the roof 104.

Figure 4C:
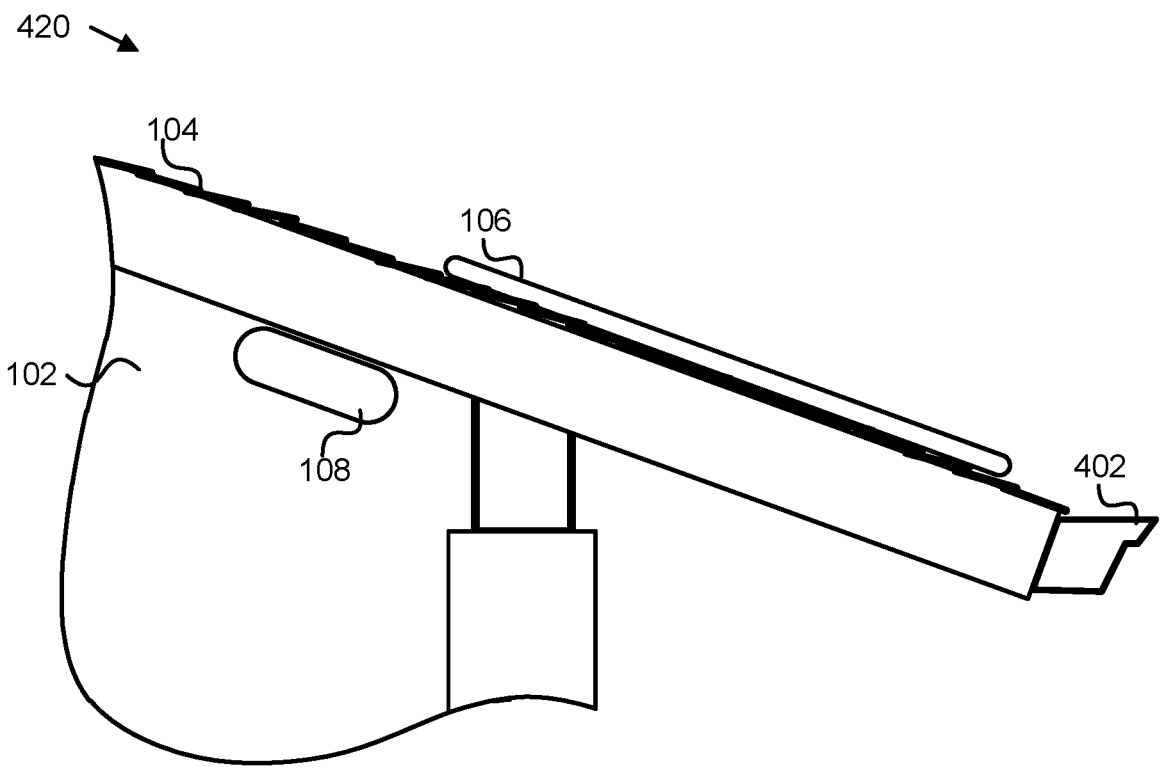
FIG. 4C is a schematic block diagram illustrating a certain embodiment of a system for efficient control of a heating element.

FIG. 4C depicts one embodiment of a system 420 for efficient control of a heating element 106. In the depicted embodiment, the system 400 includes a sensor 108 disposed beneath the roof 104 within a building 102 (e.g., in an attic or the like), in order to detect data indicating a state of water for the heating element 106, or the like. For example, in various embodiments, the sensor 108 may comprise a radar sensor 108, an ultrasonic sensor 108, or the like, oriented substantially upward toward the sky from within the house 102, but at a pitch of the roof 104, which may sense data indicating a state of water through materials of the roof 104.

Figure 4D:
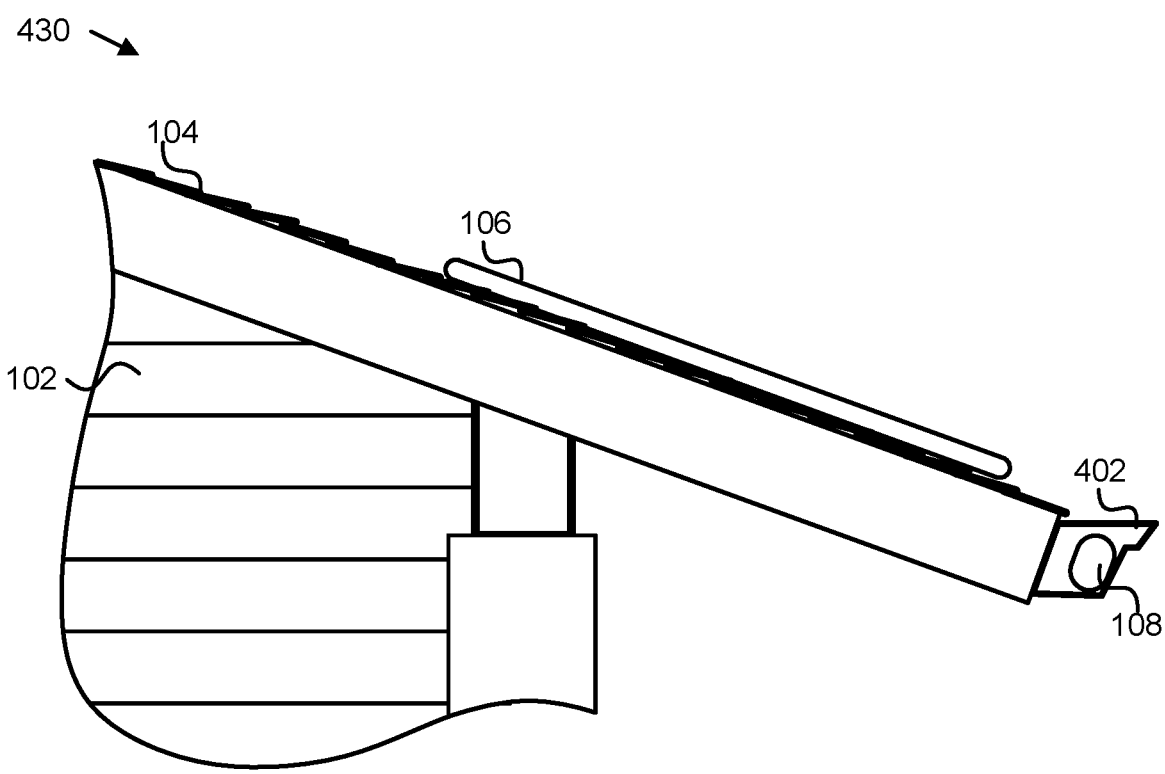
FIG. 4D is a schematic block diagram illustrating another embodiment of a system for efficient control of a heating element.

FIG. 4D depicts one embodiment of a system 430 for efficient control of a heating element 106. In the depicted embodiment, the system 400 includes a sensor 108 disposed in a gutter 402 (e.g., a rain gutter, a downspout, or the like) of the roof 104, in order to detect data indicating snow, ice, other blockages within the gutter 402, a state of water for the heating element 106, or the like. While the heating element 106 is disposed on the roof 104, in the depicted embodiment, in other embodiments, a heating element 106 may be disposed within the gutter 402, instead of or in addition to the heating element 106 disposed on the roof 104.

Figure 5:
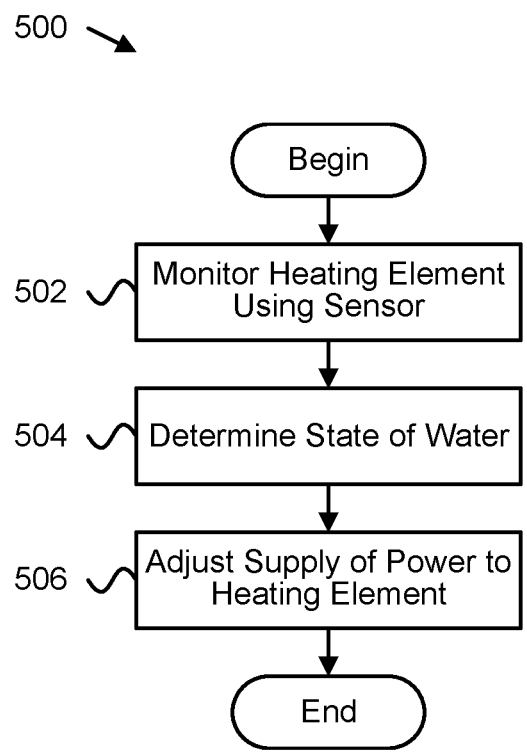
FIG. 5 is a schematic flow chart diagram illustrating one embodiment of a method of efficient control of a heating element.

FIG. 5 depicts one embodiment of a method 500 of efficient control of a heating element 106. The method 500 begins, and a hardware controller device 110 and/or a backend module 122 is configured to monitor 502 a heating element 106 using a sensor 108 to detect data indicating a state of water in proximity to the heating element 106 (e.g., and/or of an associated roof, rain gutter, downspout, sidewalk, driveway, window, floor, ski resort or other location, or the like). A hardware controller device 110 and/or a backend module 122 is configured to determine 504 a state of water in proximity to the heating element 106 based on the monitored 502 data from the sensor 108. A hardware controller device 110 and/or a backend module 122 is configured to adjust 506 a supply of power 202 to the heating element 106 using a switch device 204 based on the determined 504 state of water in proximity to the heating element 106 and the method 500 ends.

Figure 6:
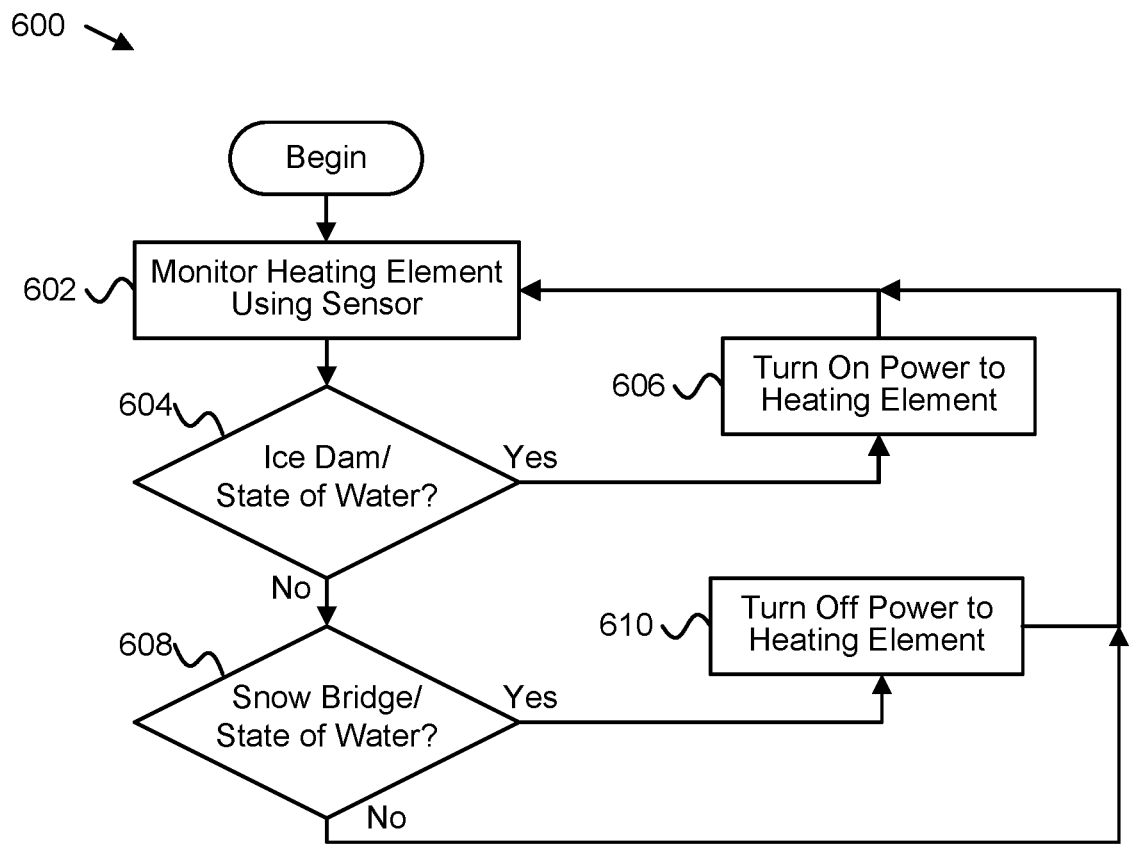
FIG. 6 is a schematic flow chart diagram illustrating a further embodiment of a method of efficient control of a heating element.

FIG. 6 depicts one embodiment of a method 600 of efficient control of a heating element 106. The method 600 begins and a hardware controller device 110 and/or a backend module 122 is configured to monitor 602 a heating element 106 and/or an associated roof, rain gutter, downspout, sidewalk, driveway, window, floor, ski resort or other location, or the like using a sensor 108 to detect data indicating a state of water in proximity to the heating element 106 and/or for an associated roof, rain gutter, downspout, sidewalk, driveway, window, floor, ski resort or other location, or the like.

If a hardware controller device 110 and/or a backend module 122 detects 604 an ice dam 312 and/or another predefined state of water likely to cause damage (e.g., an ice state, a snow state, or the like), the hardware controller device 110 and/or the backend module 122 turns on 606 power 202 to the heating element 106 and continues to monitor 602 the heating element 106 and/or an associated roof, rain gutter, downspout, sidewalk, driveway, window, floor, ski resort or other location, or the like using the sensor 108. If the hardware controller device 110 and/or the backend module 122 detects 608 a snow bridge 302 and/or another predefined state of water not likely to cause damage (e.g., a dry state, a temperature below a temperature threshold at which a heating element 106 is likely to be effective, or the like), the hardware controller device 110 and/or the backend module 122 turns off 610 power 202 to the heating element 106 and continues to monitor 602 the heating element 106 and/or an associated roof, rain gutter, downspout, sidewalk, driveway, window, floor, ski resort or other location, or the like using the sensor 108.

A means for monitoring a heating element 106, in various embodiments, may include one or more of a sensor 108 (e.g., a camera or other optical sensor, a thermometer, an ultrasonic sensor/transponder or other acoustic sensor, a radar sensor/transponder, a piezoelectric sensor, a fiber optic lens, an ohmmeter or other impedance sensor, a moisture sensor, a load sensor), a hardware controller device 110, a backend server 120, a backend module 122, a processor (e.g., a CPU, a processor core, an FPGA or other programmable logic, an ASIC, a controller, a microcontroller, and/or another semiconductor integrated circuit device), hardware, and/or executable code stored in a non-transitory computer readable storage medium. Other embodiments may include substantially similar or equivalent means for monitoring a heating element 106.

A means for determining a state of water in proximity to a heating element 106 based on monitoring, in various embodiments, may include one or more of a hardware controller device 110, a backend server 120, a backend module 122, a sensor 108, a processor (e.g., a CPU, a processor core, an FPGA or other programmable logic, an ASIC, a controller, a microcontroller, and/or another semiconductor integrated circuit device), hardware, and/or executable code stored in a non-transitory computer readable storage medium. Other embodiments may include substantially similar or equivalent means for determining a state of water in proximity to a heating element 106 based on monitoring.

A means for adjusting operation of a heating element 106 based on a state of water in proximity to the heating element 106, in various embodiments, may include one or more of a hardware controller device 110, a backend server 120, a backend module 122, a switch device 204 (e.g., an electrical switch, a relay, a contactor, an amplifier, a dimmer, a hydronic pump, and/or another control device capable of adjusting operation of and/or an amount of power for a heating element 106), a processor (e.g., a CPU, a processor core, an FPGA or other programmable logic, an ASIC, a controller, a microcontroller, and/or another semiconductor integrated circuit device), hardware, and/or executable code stored in a non-transitory computer readable storage medium. Other embodiments may include substantially similar or equivalent means for adjusting operation of a heating element 106 based on a state of water in proximity to the heating element 106.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present disclosure may be embodied as an apparatus, system, method, and/or computer program product. Accordingly, aspects of the present disclosure may take the form of an entirely hardware embodiment, an entirely software embodiment (e.g., including firmware, resident software, micro-code, etc. stored on a non-transitory computer readable storage medium) or an embodiment combining software and hardware aspects that may all generally be referred to herein as a "circuit," "module," or "system." Furthermore, aspects of the present disclosure may take the form of a computer program product embodied in one or more non-transitory computer readable storage medium(s) having program code embodied thereon.

Many of the functional units described in this specification have been labeled as modules, in order to more particularly emphasize their implementation independence. For example, a module may be implemented as a logic hardware circuit comprising custom VLSI circuits or gate arrays (e.g., an application specific integrated circuit), off-the-shelf semiconductors such as logic chips, transistors, and/or other discrete components. A module may also be implemented in one or more programmable hardware devices such as field programmable gate arrays, programmable array logic, programmable logic devices, or the like.

Modules may also be implemented at least partially in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more non-transitory computer readable storage media. A computer program product may include a non-transitory computer readable storage medium (or media) storing computer readable program instructions thereon for causing a processor to carry out aspects of the present disclosure.

A computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM"), a semiconductor memory device (e.g., NAND Flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), or the like), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and/or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, script instructions, machine dependent instructions, microcode, firmware instructions, state-setting data, or either source code or object code written in any combination of one or more programming languages, including an object oriented programming language such as Smalltalk, C++, Java, Python, JavaScript, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
    a sensor configured to detect a state of water in proximity to a heating element, the sensor comprising a camera device disposed on a same surface as the heating element and the heating element being at least partially within a view of the camera device;
    a switch device configured to control a supply of power to the heating element; and
    a hardware controller device in communication with the sensor and the switch device, the hardware controller device configured to adjust the supply of power to the heating element using the switch device based on the state of water in proximity to the heating element by at least:
        determining that the state of water in proximity to the heating element comprises a snow bridge suspended over and covering the heating element in response to detecting a cavity in snow or ice around the heating element based on image data of the heating element within the cavity of the snow bridge from the view of the camera device on the same surface as the heating element; and
        turning off the supply of power to the heating element in response to determining that the state of water in proximity to the heating element comprises the snow bridge suspended over and covering the heating element.

2. The apparatus of claim 1, wherein the heating element is disposed one or more of on a roof, in a rain gutter, in a downspout, and in a pipe.

3. The apparatus of claim 1, wherein the state of water comprises one or more of a wet state, a snow state, an ice state, and a dry state.

4. The apparatus of claim 1, wherein the state of water comprises an ice dam at least partially blocking drainage of water from a roof on which the heating element is disposed and the hardware controller device is configured to turn on the supply of power to the heating element using the switch device in response to the sensor detecting the ice dam.

5. The apparatus of claim 1, wherein the hardware controller device is further configured to send a status of the heating element to a hardware computing device.

6. The apparatus of claim 5, wherein the status comprises one or more of a photo from the sensor, a video from the sensor, a temperature from the sensor, electrical current drawn by the heating element, power consumption of the heating element, and energy usage of the heating element.

7. The apparatus of claim 5, wherein the hardware controller device is further configured to adjust the supply of power to the heating element using the switch device based on user input from the hardware computing device, the user input provided in response to the status.

8. The apparatus of claim 1, further comprising a battery for one or more of the sensor and the hardware controller device, the battery configured to receive power inductively from an electrical line of the heating element.

9. The apparatus of claim 1, further comprising one or more photovoltaic elements and a battery, a capacity of the battery and a power rating of the one or more photovoltaic elements selected to power one or more of the sensor and the hardware controller device using the battery while the one or more photovoltaic elements are covered by snow.

10. The apparatus of claim 1, further comprising a light source configured to illuminate one or more of the heating element and a surrounding area.

11. The apparatus of claim 10, wherein the light source illuminates one or more of the heating element and the surrounding area using one or more of a spatial pattern of illumination and a temporal pattern of illumination.

12. The apparatus of claim 1, wherein data indicating the state of water comprises a change in electrical impedance of the heating element detected by the sensor.

13. The apparatus of claim 1, wherein the sensor further comprises a lens disposed in view of the heating element and one or more fiber optic strands between the lens and the camera device in communication with the hardware controller device.

14. The apparatus of claim 13, wherein the one or more fiber optic strands comprise an emitter configured to illuminate a field of view of the lens.

15. The apparatus of claim 1, wherein the sensor further comprises a radar transponder.

16. The apparatus of claim 15, wherein the radar transponder is disposed beneath a roof upon which the heating element is disposed such that the roof is between the radar sensor and the heating element and the radar sensor is configured to detect the state of water through the roof.

17. The apparatus of claim 1, wherein the sensor further comprises an acoustic sensor configured to detect the state of water based on one or more of reflected acoustic signals and acoustic resonance.

18. The apparatus of claim 1, wherein the hardware controller device is further configured to delay powering of the heating element until a temperature exceeds a temperature threshold.

19. The apparatus of claim 1, wherein the hardware controller device is further configured to adjust the supply of power to the heating element based on a command from a backend server computing device in communication with a plurality of additional hardware controller devices.

20. The apparatus of claim 19, wherein the command is to provide power to the heating element in response to a power outage, the power outage not affecting power to the heating element.

21. The apparatus of claim 1, wherein the hardware controller device is further configured to track a history of the detected state of water over time and to make subsequent adjustments of the supply of power to the heating element based at least partially on the tracked history.

22. A method, comprising:
monitoring a heating element using a sensor, the sensor comprising a camera disposed on a same surface as the heating element and the heating element being at least partially within a view of the camera;
determining that a state of water in proximity to the heating element comprises a snow bridge suspended over and covering the heating element in response to detecting a cavity in snow or ice around the heating element based on image data of the heating element within the cavity of the snow bridge from the view of the camera on the same surface as the heating element; and
adjusting operation of the heating element based on the state of water in proximity to the heating element by turning off the supply of power to the heating element in response to determining that the state of water in proximity to the heating element comprises the snow bridge suspended over and covering the heating element.

23. An apparatus, comprising:
means for monitoring a heating element using a camera disposed on a same surface as the heating element, the heating element being at least partially within a view of the camera;
means for determining that a state of water in proximity to the heating element comprises a snow bridge suspended over and covering the heating element in response to detecting a cavity in snow or ice around the heating element based on image data of the heating element within the cavity of the snow bridge from the view of the camera on the same surface as the heating element; and
means for adjusting operation of the heating element based on the state of water in proximity to the heating element by turning off the supply of power to the heating element in response to determining that the state of water in proximity to the heating element comprises the snow bridge suspended over and covering the heating element.

* * * * *